INVENTOR.
GEORGE W. MORGAN
BY Wallace B. King
ATTORNEY

United States Patent Office 3,526,086
Patented Sept. 1, 1970

3,526,086
MULTICONDUIT UNDERWATER LINE
George W. Morgan, Anaheim, Calif., assignor to North American Rockwell Corporation
Filed Apr. 12, 1968, Ser. No. 721,014
Int. Cl. D07b 1/20; F16l 11/00, 9/18
U.S. Cl. 57—149                                     1 Claim

ABSTRACT OF THE DISCLOSURE

A flexible underwater line having a plurality of conduits laid in a spiral configuration about a central core member, which member may be a conduit or a high tensile strength cable. Where the central core member is a conduit, high tensile strength cables may be situated axially along said conduit. A flexible protective sheath surrounds the spiral configuration in order to bundle the conduits together and to form an integrated cable-like structure. Within the sheath, the spaces around the conduits may be filled with a substance for providing lubricity between the conduits.

BACKGROUND OF THE INVENTION

Field of the invention

The invention relates to underwater lines and more particularly to flexible lines which may function either as flowlines or risers and which comprise a plurality of flexible conduits assembled in a spiral cable-like configuration.

Description of the prior art

In the past, underwater lines of two basic types have been utilized. One type has been the rigid solid-walled single-conduit line, formed of steel or some other such metal. The second type was comprised of flexible lines containing up to three individual conduits. Flexible lines offer certain advantages over a rigid structure, particularly in the operation of laying such lines where bending stresses may become too large for rigid lines. Also for riser applications down to approximately one hundred feet, a flexible line is capable of sustaining wide lateral displacements or excursions without suffering a failure in the line due to bending stresses.

Where two ore three flexible conduits are fashioned together and attached at given intervals, other problems frequently develop. If the attachments are rigid and close together the individual lines are not free to disfigure and bend in a random manner but can only bend and slide substantially together. Such bending movements result in mutual abrading and chafing of the conduits which will ultimately cause failure of one or more of the conduits. Where a widely spaced flexible attachment is utilized between the lines there is little resistance to longitudinal shear displacements and the flexible lines may randomly bend and thus develop individual motions of turbulent waters. The attachments become subjected, in this situation, to a great variety of periodic tension loads, and frequently the attachments fail.

As was mentioned above, the use of multiconduit flexible underwater lines in the riser application has been limited in the prior art to approximately one hundred feet. A new approach to the design of multiconduit underwater lines is required to overcome the problems described above and to permit the use of more than two or three conduits forming a line. The present invention provides such an approach and comprises a multiconduit flexible underwater line which may contain several times more individual conduits and has the capability of being laid to depths of several thousand feet and in the riser application for functioning at such depth.

SUMMARY OF THE INVENTION

In accordance with the present invention there is set forth a flexible multiconduit underwater line which may function either as a riser structure or a flowline. In the riser application, there may be included in the structure one or more cable lines for providing tension sustaining capabilities. The underwater line structure comprises a plurality of conduits which are laid in a spiral configuration about a straight or axially aligned core member, which may be a separate conduit or a tension sustaining cable. If the core member comprises a pipe of steel or other metal capable of sustaining tension, no other cable would be needed. For the purpose of integrating the total line structure a filler substance surrounds the conduits filling the spaces and providing lubricity between the conduits while adding insulating and isolating characteristics thereto. The exterior layer of the underwater line is formed by a flexible protective sheath which bundles together the variety of conduits which are spiraled about the core member. As a riser structure, more tensile strength is needed in the line since it will be subjected to relatively high tension in order to minimize lateral excursions thereof caused by turbulent waters.

Where the line is designed as a flowline to be laid down on the underwater ground surface, the line need only contain sufficient tensile strength to withstand the tensions exerted thereon during the laying operation thereof.

OBJECTS

It is therefore an object of the present invention to provide an improved underwater multiconduit line.

Another object of the present invention is to provide a flexible underwater line having a plurality of conduits, which line may function either as a riser or a flowline.

A further object of this invention is to provide a flexible multiconduit underwater line having a plurality of conduits laid in a spiral manner about a central core member for eliminating accumulated longitudinal displacement of said conduits when such line is subjected to bending.

A still further object of the present invention is to provide a flexible multiconduit underwater line having said conduits fashioned in a spiral manner about a central core member, and further having high tension sustaining cables included in the line for providing use of such a line as a riser operating at depths of several thousand feet.

Still other objects, features, and attendant advantages of the present invention will become apparent to those skilled in the art from a reading of the following detailed description of an embodiment constructed in accordance therewith, taken in conjunction with the accompanying drawings.

DESCRIPTION OF THE PREFERRED EMBODIMENTS

Figure 1:
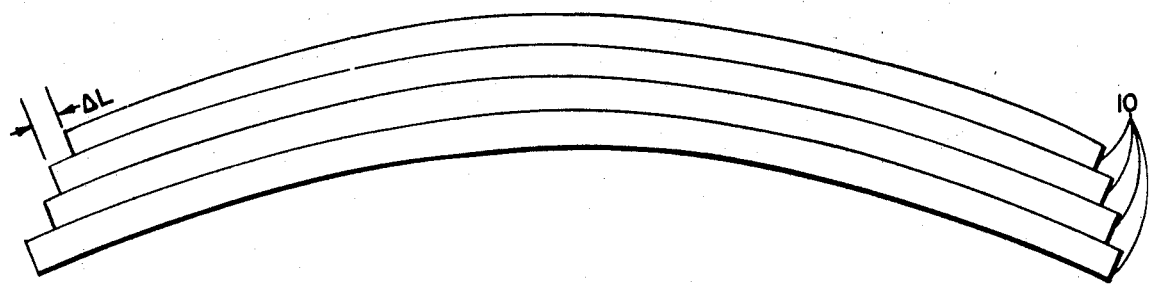
FIG. 1 illustrates a plurality of longitudinal members subjected to bending, which results in accumulative displacement of the ends of said members with respect to each other.
Figure 2:
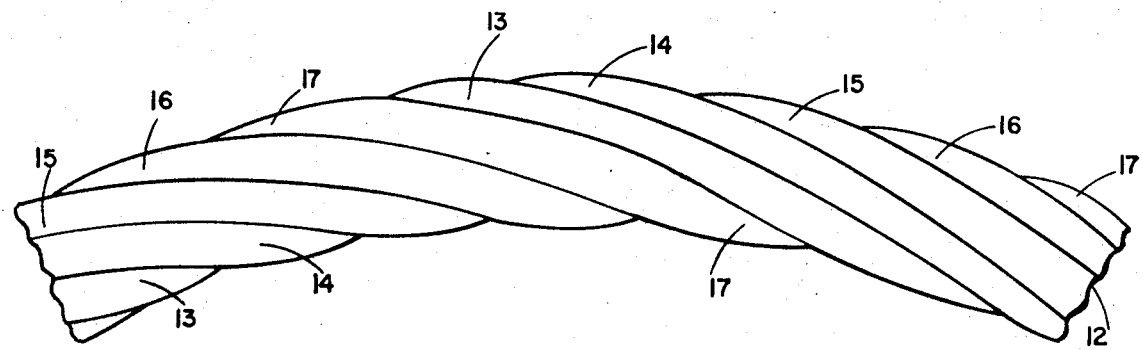
FIG. 2 shows a plurality of conduits which have been laid in a spiral configuration to form a line, with the whole configuration subjected to bending for illustrating the concept of the present invention.

Referring now to FIG. 1, there is illustrated a plurality of longitudinal members 10 which are in a bent position. The purpose of this illustration is to show how the ends of the individual members are accumulatively displaced an amount ΔL with respect to each other under such a bent condition. The member farthest from the center of curvature is longitudinally displaced by the greatest amount. In an underwater flowline having a plurality of conduits, where such conduits have a substantially parallel orientation with respect to each other, such accumulative longitudinal displacement occurs periodically and in rhythm with the movement of the water in which the line is placed. Where a line has a plurality of conduits which are intermittently bound together, great strain is placed upon the binding connections when the line is bent and the individual members constantly abrade each other as the individual members displaced themselves with respect to each other. If the intermittent binding are sufficiently placed to allow individual movement of the separate conduit members, then one conduit may bend in one direction while another conduit bends in another direction and the points of attachment receive the constant stress of such action.

Where an integral underwater line having a plurality of conduits is required, and it is desired that such underwater line behave as a single line with the individual conduits bound together, a different approach is suggested by the concept of the present invention as shown in FIG. 2.

Referring now to FIG. 2, there is shown an underwater line structure 12 comprising a plurality of conduits 13, 14, 15, 16 and 17. These conduits 13 through 17 are laid together in a spiral configuration to form a single integrated multiconduit line 12. The line 12 is shown in a bent formation to illustrate the advantage gained by such a configuration. The advantage obtained thereby is the elimination of the accumulative longitudinal displacement of the members with respect to each other under the stress of a bent condition. For example, conduit 17 at the upper portion of the structure is at the outer radius of line 12. At this point, conduit 17 is under tension stress and a certain amount of local longitudinal displacement will be present. One-half spiral turn removed, namely, on the underside of line 12, conduit 17 is under compressive force, which causes a counteracting longitudinal displacement. Therefore, over the entire length of the bend in line 12, conduit 17 is not displaced with respect to the other conduits. In the same manner, each conduit of line 12 undergoes the same sequence of tension and compression with varying amounts of local displacements occurring within the length of each spiral of line 12.

An underwater line may be fashioned after the manner of line 12 and may contain a large number of flexible conduits of varying sizes. Such a structure is illustrated in the following FIG. 3.

Figure 3:
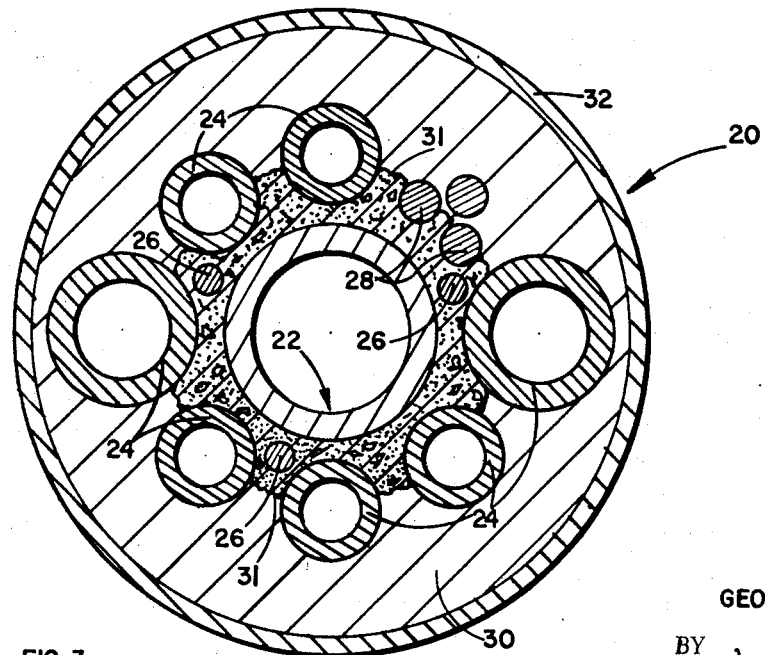
FIG. 3 shows a cross-sectional view of an underwater line comprising a plurality of conduits according to the present invention.

Referring now to FIG. 3, there is shown a cross-sectional view of an underwater line 20. There is shown a central core member 22, which is here illustrated as a conduit and which may be a steel or other metal pipe or some type of flexible hose. Where high tension capacity for line 20 is required, beyond that provided by a steel pipe, core member 22 may comprise a steel cable.

Situated about core member 22 there is shown a plurality of flexible conduits 24, which may have varying diameters. Conduits 24 may be high pressure flexible hoses, or plastic or metal tubes which may be utilized to transport a variety of substances. In the operation of oil production from underwater sources, it is frequently required to provide gas under pressure through one conduit in order to force the oil in a return path through another conduit to a surface facility. At the same time, waste gases may need to be vented, and other conduits are available for this purpose. A plurality of conduits forming a single line provides for these uses plus any others which the circumstances may require.

To provide added tensile strength to line 20, there is provided a plurality of steel cables 26 situated near core member 22. Such cables may or may not be required depending upon the material comprising core member 22. Where needed, such cables provide the tensile strength necessary for sustaining tension loads exerted on line 20 while being laid, or if line 20 is utilized as a riser, cables 26 can withstand sufficient tension to allow line 20 to be maintained in a substantially vertical straight line.

Other conduits 28 are shown forming a portion of underwater line 20. Such conduits 28 may provide conduction of electrical power and/or communication signals where the circumstances so require. An underwater life support facility would be an example.

The entire configuration (excluding cables 26 which would be axially laid) of conduits 24 and conduit-conductors 28 are situated, as mentioned above, about core member 22 in a spiraling manner. The spaces between such longitudinal members are here shown to be occupied by two separate fillers substances 30 and 31. A wide choice of substances is available to one designing such a structure as line 20. Filler substance 31 may be an elastomer of the polyvinyl chlorides, the butyls, the neoprenes, or the polypropylenes. As conduits 24 are spiraled about core member 22 they become imbedded in elastomeric substance 31 which provides a cushion between said conduits and minimizes the effects of local displacement and movements which still exist during bending of the line. A particularly advantageous substance is polypropylene in a fibrous form. The fibers or strands greatly enhanced the lubricity between conduits.

Substance 30 may be an elastomer taken from the above groups, but which has been foamed in order to provide buoyancy to line 20.

Surrounding elastomeric filler 30 and forming a smooth surface for line 20 is a flexible plastic sheath 32. The plastic may also be formed from the groups of elastomers above described, except that it would be more dense and have a tougher surface. Sheath 32 is a means for firmly bundling together the whole assembly of spiraling conduits, cables, and conductors along with the surrounding filler 30. However, it should be kept in mind that a multiconduit flexible underwater line may function adequately under some circumstance without the addition of elastomeric filler 30 and flexible protection sheath 32. A spiral configuration of conduits could merely be bundled together by intermittent hoops or other binders well known to those skilled in the art.

Although the invention has been described in detail, it is to be understood that the same is by way of illustration and example only, and is not to be taken by way of limitation, the spirit and scope of this invention being limited only by the terms of the appended claim.

What is claimed is:

1. A flexible underwater line comprising:
   a core member axially situated within said line,
   a plurality of conduits laid in a spiral configuration about said core member,
   a filler situated about said conduits for providing insulation and isolation therebetween,
   a protective sheath surrounding said conduits and said filler and for integrating the structure of said line; and
   means for sustaining tension loads, said means situated axially along said core member and including said filler;
   said core member comprising high tensile strength conduit;
   said filler comprising a non-foam elastomer substance and a foam elastomer substance;
   said non-foam elastomer substance being chosen from the group consisting of polyvinyl chlorides, butyls, neoprenes and polypropylenes, and being disposed substantially between said core member and said plurality of conduits; and
   said foam elastomer substances being chosen from said group and being disposed substantially exterior of said plurality of conduits.

(References on following page)

References Cited

UNITED STATES PATENTS

| | | | |
|---|---|---|---|
| 2,106,803 | 2/1938 | Johnson et al. | 57—59 |
| 2,725,713 | 12/1955 | Blanchard | 57—149 |
| 3,269,422 | 8/1966 | Mathews et al. | 138—111 |
| 3,315,703 | 4/1967 | Mathews et al. | 138—111 |
| 3,400,737 | 9/1968 | Mathews et al. | 138—111 |
| 3,425,453 | 2/1969 | Fuller | 138—111 |

FOREIGN PATENTS

| | | |
|---|---|---|
| 242,356 | 10/1960 | Australia. |
| 627,031 | 7/1949 | Great Britain. |
| 676,224 | 7/1952 | Great Britain. |

DONALD E. WATKINS, Primary Examiner

U.S. Cl. X.R.

138—111